Nov. 29, 1966  A. C. DANNETTELL  3,289,062
ELECTRIC DRIVE SYSTEM FOR INDUSTRIAL TRUCK

Filed April 2, 1963  4 Sheets-Sheet 1

INVENTOR
ALAN C. DANNETTELL

BY

ATTORNEY

Nov. 29, 1966   A. C. DANNETTELL   3,289,062
ELECTRIC DRIVE SYSTEM FOR INDUSTRIAL TRUCK
Filed April 2, 1963   4 Sheets-Sheet 3

FIG.4

INVENTOR
ALAN C. DANNETTELL

BY

ATTORNEY

FIG.5

United States Patent Office 3,289,062
Patented Nov. 29, 1966

3,289,062
ELECTRIC DRIVE SYSTEM FOR
INDUSTRIAL TRUCK
Alan C. Dannettell, Philadelphia, Pa., assignor, by mesne assignments, to Eaton Yale & Towne Inc., a corporation of Ohio
Filed Apr. 2, 1963, Ser. No. 270,093
14 Claims. (Cl. 318—139)

This invention relates to an electric drive system for a battery operated truck.

The purpose of this invention is to provide a simple, low cost, efficient, compact and substantially maintenance free electric drive system having continuous or stepless speed control.

To this end, the drive system of the invention utilizes a multiple phase alternating current induction motor, preferably of the squirrel cage variety, in contrast to prior drive systems for industrial trucks which utilize direct current motors. As is well known, an induction motor has no brushes or commutators. For this reason among others, it is relatively inexpensive and maintenance free. Thus, the use of such a motor in the drive system in an industrial truck provides substantial advantage from the viewpoint of initial cost and subsequent maintenance. The latter is very important in that time spent in maintenance represents a substantial part of the cost of operation of an industrial truck.

Efficient and effective use of a multiple phase alternating current squirrel cage induction motor as the drive motor of an industrial truck is made possible, in accordance with the invention, by a novel electronic coupling arrangement by which direct current from the battery is converted into multiple phase alternating current to operate the induction motor and by which the speed of the motor may be varied over a large range by varying the frequency of the alternating current to the motor, while the average voltage of each alternation of alternating current is maintained substantially proportional to the frequency to prevent high heat losses as the frequency is changed.

Thus, the drive system of the invention, in addition to providing the maintenance free advantages of an induction motor, also provides continuous or stepless speed control of the motor through varying of the frequency of the alternating current and also provides extremely efficient operation of the motor in that the average voltage is held proportional to the frequency so that the current draw from the battery is substantially proportional to the speed of the motor. The drive system of the invention therefore requires less frequent charging of the batteries of the truck as compared to prior systems incorporating direct current motors.

According to the further features of the invention, the speed control system for the induction motor is preferably comprised exclusively of solid state circuits, including transistors and like components, of relatively small size, lightweight, and insensitivity to electrical change occasioned by shock and vibration. These characteristics provide significant advantage for battery driven industrial trucks where dependabiilty despite rough handling is essential, and reductions in the weight and volume occupied by the control equipment is desired.

It is accordingly a more specific object of the invention to provide an improved alternating current motor drive system for battery operated trucks, and incorporating a continuous or stepless speed control system wherein both the frequency of the alternating current is made continuously variable to change speed and wherein the average power to the motor is concurrently regulated at each different frequency to obtain optimum motor performance without unnecessarily heating the motor.

Other objects and many additional advantages will be more readily understood by those skilled in the art after a detailed consideration of the following specification taken with the accompanying drawing wherein:

Figures 1, 2, 6:
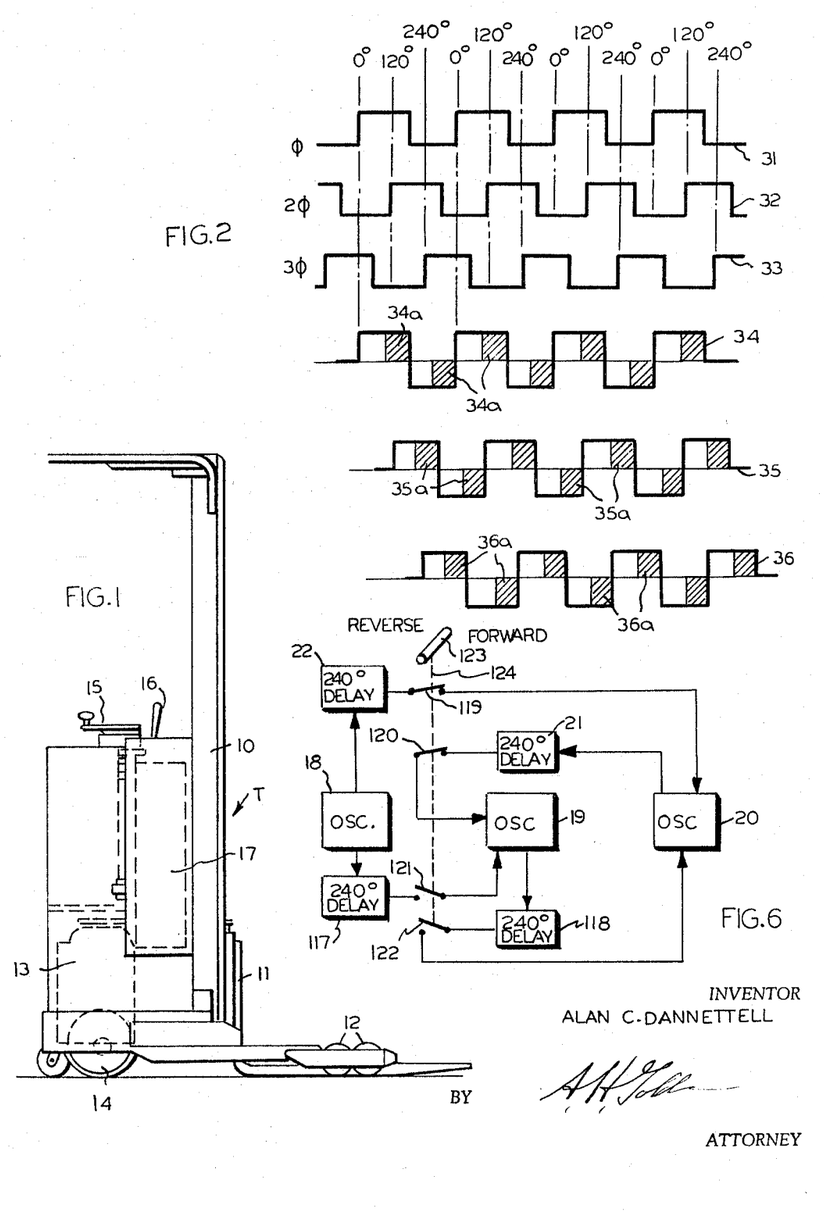
FIG. 1 is a schematic illustration of one type of battery operated industrial trucks in which the present invention may be employed.
FIG. 2 is a waveform timing diagram for assistance in understanding the operation of the three phase motor control system of the present invention.
FIG. 6 is an electrical block diagram supplementing the diagram of FIG. 3, and illustrating the manner of reversing the motor to reverse the direction of the drive of the industrial truck.

Referring to FIG. 1, there is shown an industrial lift truck of the type adapted to be controlled by the motor control system of the present invention. It will be understood, however, that the present invention may be employed on a number of different industrial trucks and for other purposes. As shown, the truck T is of a conventional construction, and includes vertically extending uprights 10, and a load carriage 11 mounted for vertical upward and downward movement on the uprights 10 for lifting and positioning loads. The truck is provided with forward supporting wheels or rollers 12 located forwardly of the lift mechanism for balance and proper support, and a rearwardly located traction wheel 14 that is adapted to be driven by an alternating current drive motor 13, located above the traction wheel 14. In the preferred construction, the drive motor 13 and the traction wheel 14 are formed as a combined unit, which may be rotated to turn the truck by means of a steering handle 15 being connected to the combined unit by means of a vertical shaft and suitable gearing, as schematically illustrated. Positioned adjacent to the steering handle 15, there is provided a control handle or lever 16, by means of which the operator may variously control the energization of the motor through the motor control mechanism to be described for controlling the speed and positioning of the truck. A storage battery 17 will supply the truck power.

Figure 3:
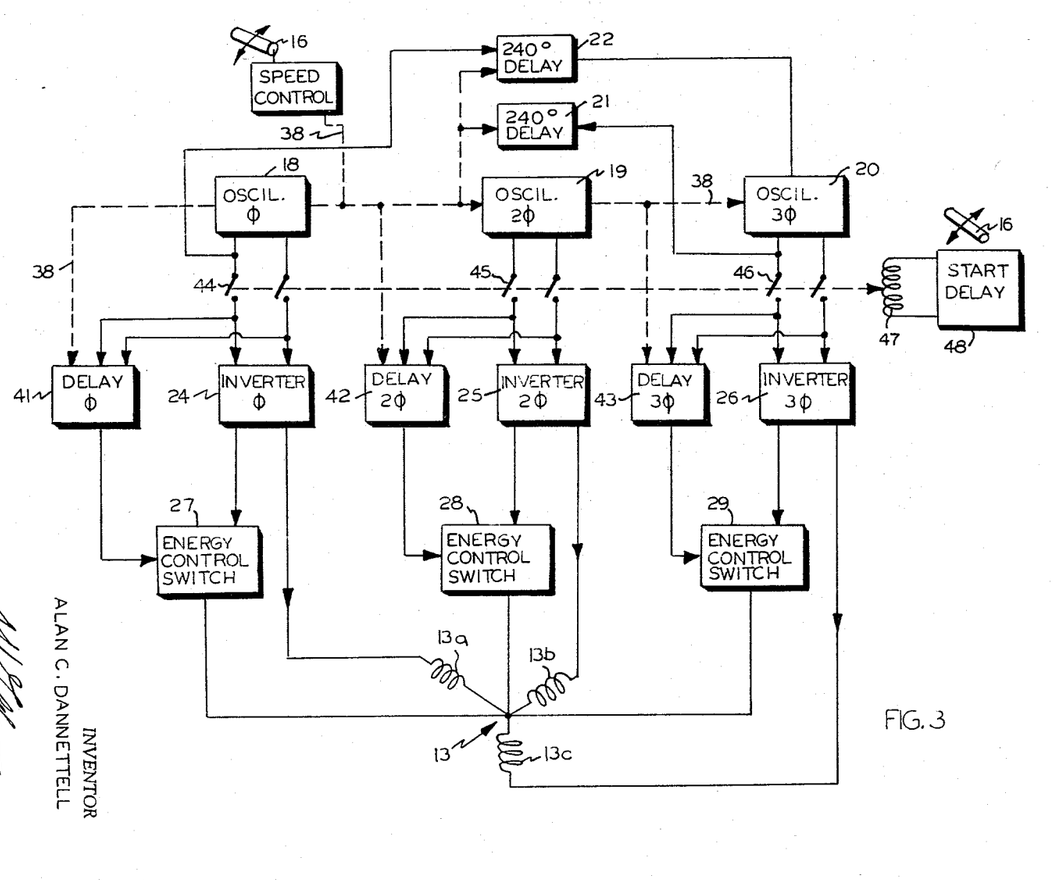
FIG. 3 is an electrical block diagram illustrating the component circuits of the preferred motor speed control system and their manner of interconnection.

FIG. 3 generally illustrates in block diagram form one preferred embodiment of the motor control system according to the present invention, that is energizable by the storage battery 17, and that controls the energizing of a three-phase induction motor 13, preferably of the squirrel cage type, for controlling the speed and positioning of the truck.

As shown the system generally comprises three adjustable frequency oscillators 18, 19, and 20, with one for each phase winding 13a, 13b, and 13c of the three phase motor 13, three power inverter circuits 24, 25, and 26, each for producing alternating current power to a different one of the three phase motor windings at the frequency determined by the associated oscillator, and three energy control switch mechanisms 27, 28, and 29, for regulating the amount of power from the inverters that is applied to energize the motor windings.

As is known to those skilled in the art, the speed of an induction motor is controlled by the frequency of the alternating current power being applied to its windings. The speed of motor 13 in the disclosed embodiment may be selectively adjusted or varied over a wide range by controlling the frequency of the oscillators 18, 19, and 20. However, as is also known to those skilled in the art, any increase in the frequency of alternating current energy without change in the amplitude of the A.-C. signal also would increase the power applied to the motor excessively over that required to drive the truck at higher speed, and this excess in power would be essentially wasted energy being drained from the battery 17 and being dissipated in the form of overheating the motor 13. For this reason, the energy control switches 27, 28, and 29 are provided for proportionately regulating the amount of the power produced by the inverters at each frequency that is applied to the motor windings, such that at each different speed of the motor, the motor windings receive only a sufficient amount of power at that frequency as is required for properly operating the truck.

Thus, the system of the present invention converts the power from a direct current battery into an adjustable frequency alternating current that is applied to drive the alternating current induction motor at different speeds, and additionally automatically regulates the amount of the alternating current power being applied to the motor at each different speed to insure that the motor receives only the correct amount of power at that speed for properly operating the truck.

Returning to FIG. 3 for a more complete explanation of the system, the three oscillators 18, 19, and 20, are each preferably square wave oscillators, or multivibrators for producing square wave pulses, and are synchronized together to always operate at the same frequency and in a given three phase displaced arrangement as is required for suitably energizing the three-phase windings 13a, 13b, and 13c of the alternating current motor 13.

The square waves produced by these multivibrators and the fixed delayed phase relationship which is maintained therebetween at each frequency are illustrated by the uppermost three waveforms in FIG. 2. As shown, the upper waveform 31 represents the signal being produced by the multivibrator 18, the waveform 32 represents the signal produced by multivibrator 19, being phase displaced by 120 electrical degrees from that of multivibrator 18; and the waveform 33 represents the signal produced by multivibrator 20, being phase displaced by 120 electrical degrees from the signal 32 produced by multivibrator 19 waveform 33 naturally is displaced by 240 degrees from the signal 31 being produced by multivibrator 18.

As noted above, each of these multivibrator signals determines the frequency and phase of its associated power inverter circuit, whereby the substantially square waveform 34 being produced by inverter circuit 24 is maintained in phase with the multivibrator signal 31; the waveform 35 being produced by the second inverter circuit 25 is maintained in phase with multivibrator signal 32, and the waveform 36 being produced by inverter circuit 26 is maintained in phase with the multivibrator signal 33.

For properly synchronizing the three oscillators 18, 19, and 20, such that each oscillates at the same frequency as the others but each being phase displaced by 120° from the next, there is provided a pair of phase delayed synchronizing circuits 21 and 22 interconnecting the three oscillators. The synchronizing delay circuit 22 interconnects the first phase oscillator 18 with the third phase oscillator 20 and maintains a 240° time delay between these two oscillators, as is desired. Similarly, the synchronizing circuit 21 interconnects the third phase oscillator 20 with the second phase oscillator 19 and maintains a 240° phase delay therebetween. Referring to waveforms 32 and 33 of FIG. 2, it will be noted that for proper three phase operation, the third phase 33 must be time delayed by 240° from the first phase 31 and must also be time delayed by 120° from the second phase 32. However, stating this in another way, the third phase 33 may also be advanced by 240° from the second phase, and this function is performed by the synchronizing phase delay circuit 21.

It will be apparent to those skilled in the art that three synchronizing time delay circuits (not shown) may be employed instead of the two circuits 21 and 22 as described, with each one of the three interconnecting a different pair of the oscillators, e.g., first to second, second to third, and third to first.

The power being produced by each of the inverter circuits for application to the different phase windings of the motor is adapted to be regulated by the energy control switches 27, 28 and 29, respectively, and these switches function during each half cycle of the inverters to apply a preselected portion of the waveforms 34, 35, and 36, to the windings 13a, 13b, and 13c, respectively. This portion is generally indicated by the cross-hatched region 34a in waveform 34, portion 35a in waveform 35, and portion 36a in waveform 36. For increasing the power being applied to the motor windings, these switches are closed earlier during each half cycle of the inverter signals to increase the cross-hatched regions and to transmit a greater portion of each of the square wave-shape pulses to the motor windings, whereas to reduce the amount of power from the inverters that is directed to energize the motor windings, these switches are operated later during each half cycle of the pulse to reduce the cross-hatched regions and hence reduce the net amount of energy being delivered to the motor windings. It will be noted, that the increase in power, or the reduction of power, being applied to the windings is independent of frequency of the inverter signals being applied to the windings, whereby the frequency and power control may be independently or jointly controllable, as is desired to obtain the optimum energization of the motor for each different speed of operation.

For adjusting the motor speed, the speed control lever 16 is connected to vary the frequency of the three oscillators 18, 19, and 20 as is illustrated by the dotted line 38 interconnecting the speed control lever with the oscillators. Additionally, this speed control lever 16 is also coupled to adjust the energy control switches 27, 28, and 29 by means of time delay circuits 41, 42, and 43, respectively. Thus, for each different speed adjustment of the lever 16, the frequencies of the oscillators 18, 19, and 20, are varied together and the energy control switches 27, 28, and 29 are simultaneously varied in such manner as to proportionately adjust or modulate the width of the pulses from the inverters that is applied to energize the motor windings, thereby to obtain the optimum energization of the motor for that speed.

To insure that the multivibrators 18, 19, and 20 are initially maintained in the desired three phase synchronism, before being applied to control the operation of the inverter circuits 24, 25, 26, there is provided a series of interconnected or ganged switches 44, 45 and 46 for selectively interconnecting each of the oscillators with its associated inverter circuit. Each of these pairs of switches is normally in the open position, as shown, and all switches are actuated together to the closed position only after a given time delay permitting the three oscillators 18, 19, and 20, to achieve properly phased synchronized relationship, as is required. To perform this function, the switches 44, 45, and 46, may be individual pairs of switch contacts of a start relay 47, which is energized by a time delay circuit 48 after a given time interval has elapsed after the multivibrators have been energized. Consequently, upon initially starting the system, by actuation of the speed control lever 16, power is initially applied to the oscillators 18, 19, and 20 for a short time interval to enable these oscillators to obtain the proper phase synchronization, and thereafter, the relay 47 is energized by the time delay circuit 48 to close the switches 44, 45, and 46 interconnecting each of the oscillators with its associated inverter circuit thereby to enable power to be applied to the motor.

To provide for reversing the direction of rotation of the three phase motor 13, the phase sequence of the three oscillators 18, 19 and 20 is changed without otherwise changing the circuit. One preferred manner of accomplishing this result is shown in FIG. 6 wherein a second pair of synchronizing delay circuits 117 and 118 is employed and adapted to be selectively inserted into the system or removed by positioning a direction control lever 123. As shown, for forward operation of the motor the direction control lever 123 is positioned to the right and in such position closes the switches 119 and 120 to interconnect the synchronizing time delay circuit 22 between oscillator 18 and oscillator 20, and to interconnect the synchronizing delay circuit 21 between oscillator 20 and oscillator 19. As previously described this connection synchronizes the three oscillators together to provide oscillator 18 as the first phase, oscillator 19 as the second phase, and oscillator 20 as the third phase. In this forward position of the direction control lever 123, the switches 121 and 122 are open and therefore disconnect the delay circuits 117 and 118 from the oscillators.

When it is desired to reverse the motor, the direction control lever is positioned to the left, and in this position simultaneously opens the switches 119 and 120 and closes the switches 121 and 122. Opening switches 119 and 120 disconnects delay circuits 22 and 21, and closing switches 121 and 122 selectively interconnects the delay circuits 117 and 118 between oscillators 18 and 19 and between oscillators 19 and 20, respectively. The delay circuit 117 functions to synchronize the oscillator 19 at 240° behind oscillator 18 and the delay circuit 118 functions to synchronize the oscillator 19 at 240° ahead of oscillator 20. Thus in the reverse position of direction control lever 123, the oscillator 18 is the first phase, as before, but the oscillator 20 and oscillator 19 reverse their phase position, with oscillator 20 becoming the second phase and oscillator 19 the third phase. This reversal of oscillator phases provides the proper relationship to reverse the direction of rotation of the motor, as is desired.

The synchronizing delay circuits 117 and 118 may be identical in circuit configuration with delay circuits 22 and 21 previously described, and further details of these circuits are accordingly not considered necessary.

As an alternative arrangement, due to the identical nature of these phase delay circuits the same synchronizing delay circuits 21 and 22 may be employed for both forward and reverse drive by the use of double pole switches for selectively changing the interconnections between the oscillators 18, 19 and 20 for each direction of rotation. This modification is not shown by FIG. 6, but is considered evident to those skilled in the art from the foregoing description.

Figure 4:
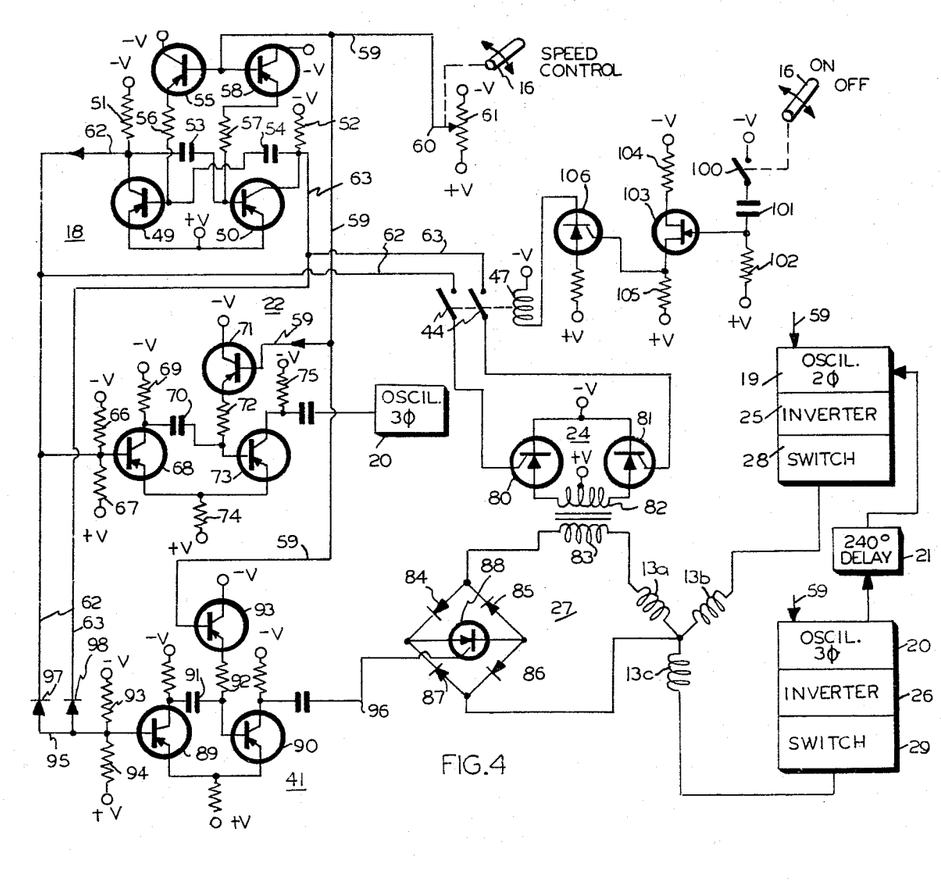
FIG. 4 is an electrical schematic diagram, partially in block diagram form, for illustrating the preferred electrical circuits employed in the system of FIG. 3.

FIG. 4 illustrates the details of one preferred group of solid state circuits that may be employed in the motor control system of FIG. 3. Although the circuits shown are for only one phase of the three phase motor control system, it will be understood by those skilled in the art that the circuits for the second and third phases are identical to those for the first phase as disclosed and need not be repeated.

The oscillator circuit 18, FIG. 3, is generallly comprised of a pair of transistors 49 and 50, FIG. 4, being interconnected in feedback relationship to provide a free running multivibrator oscillator. Specifically, the collector electrode of the transistor 49 is interconnected with the base electrode of transistor 50 by means of a timing capacitor 53, and similarly the collector electrode of transistor 50 is interconnected with the base electrode of transistor 49 by means of a timing capacitor 54. The emitter electrodes of both transistors 49, 50 are energized by the positive terminal of the battery and the collector electrodes of both transistors receive energization from the negative terminal of the battery through current limiting resistors 51 and 52, respectively. For controlling the frequency of oscillation of this multivibrator, there is provided a transistor 55 having its collector and emitter electrodes connected in series through a resistance 56 between the negative terminal of the battery and the base electrode of transistor 49. This transistor 55 serves as a variable impedance in this circuit to control the time constant of the charging circuit for timing capacitor 54. Similarly, in the other half of the multivibrator there is provided a similar transistor 58 being connected in series with a resistor 57 between the base electrode of transistor 50 and the negative terminal of the battery for controlling the time constant of the timing circuit including capacitor 53. The base electrodes of both control transistors 55 and 58 are energized in common over line 59 with an adjustable amplitude voltage to jointly control the conductivity or impedance of these transistors. The speed control lever 16 is interconnected, as shown, to adjust a variable slider 60 of energized potentiometer 61 thereby to produce an adjustable control voltage over line 59 to the multivibrator circuit. Consequently by adjusting the voltage amplitude level on line 59 by means of the speed control lever 16, the multivibrator frequency is electrically varied to oscillate at a desired different frequency over a wide continuous range as controlled by the position of the speed control lever 16.

As discussed above, the multivibrator 18 produces a square wave shape output signal over line 62, as shown by waveform 31 of FIG. 2, and an opposite polarity square waveshape output signal is taken from the collector of transistor 50 and over output line 63. The oscillator output signal over line 62 is directed to the synchronizing time delay circuit 22 that functions to produce impulses that are time delayed by 240 electrical degrees from each of the output impulses from the multivibrator circuit 18. These time delay pulses from circuit 22 are directed to the oscillator 20 controlling the energization of the third phase of the motor and serve to synchronize the oscillator 20 in the desired 240° time delayed relation with the oscillator 18 to produce the third phase waveform 33 as shown in FIG. 2.

The synchronizing time delay circuit 22 comprises a pair of transistors 68 and 73 having their collector electrodes individually energized through resistors 69 and 75 from the negative terminals of the battery and their emitter electrodes connected in common and energized by the positive battery terminal through feedback resistor 74. The base electrode of transistor 68 is biased by being connected to the junction of resistors 66 and 67, whereas the base electrode of transistor 73 is negatively biased by being connected through resistor 72 in series with regulating transistor 71 to the battery negative terminal. The collector resistor 75 of transistor 73 is lower in value than resistor 69 in the collector circuit of transistor 68 and therefore permits greater current flow through transistor 73 than through transistor 68.

In operation, transistor 73 is normally conducting and produces a voltage drop across resistor 74 that is in such direction as to normally render transistor 68 nonconducting. When a negative pulse is applied to the base of transistor 68, it is renedered conducting and produces a positive pulse through capacitor 70 and to the base transistor 73 which turns off transistor 73 and renders it nonconducting. Upon transistor 73 being renedered nonconducting, the feedback voltage drop across resistor 74 is reduced and transistor 68 continues to conduct current. However, after a period of time has elapsed, the capacitor 70 becomes reversely charged by current flow through resistor 72, transistor 71 and transistor 68 such that the potential at the base of transistor 73 returns to its original value whereupon transistor 73 again becomes conducting and the feedback voltage across resistor 74 again cuts off conduction of transistor 68 to restore the circuit to its original position. The time delay between the application of the initial negative pulse to transistor 68 and the production of a negative output pulse at the collector of transistor 73 is, therefore, proportional to the time constant of the capacitor 70, the resistor 72 and the transistor 71. Consequently, since the current flow through transistor 71 is controlled by the potential at its base electrode being received over line 59, this potential on line 59 controls the time delay of the circuit and is adjustable by varying this potential. Thus this synchronizing time delay circuit produces a 240° time delay pulse for each different frequency of the oscillator by proportionately adjusting the control voltage over line 59.

The output signals from the multivibrator 18 and being directed over lines 62 and 63 are also conveyed through the pair of switches 44 to the inverter circuit 24. The inverter circuit comprises a pair of silicon controlled power rectifiers 80 and 81 interconnected in series with a transformer primary winding 82 and having the positive and negative battery terminals connected between a center tap of the primary winding and the junction of the silicon controlled rectifiers, as shown. Since the output pulses from the multivibrator on lines 62 and 63 are 180 degrees displaced, the silicon controlled rectifiers 80 and 81 are alternately triggered into conduction during each half cycle of the multivibrator 18, whereby during one-half cycle of operation of the multivibrator, current flows through the silicon controlled rectifier 80 and in one direction through the primary winding of the transformer 82 and during the second half cycle of the multivibrator 18, current flows through the silicon controlled rectifier 81 and in the opposite direction through the transformer primary winding 82, thereby to provide alternating pulses through the primary winding of the transformer 82 at the same frequency as the frequency of the multivibrator 18.

The secondary winding 83 of the inverter transformer is connected in series with the first phase winding 13A of the motor and with a switching mechanism 27, whereby whenever the switching mechanism 27 is closed, the first phase winding 13a of the induction motor receives an alternating pulse from the inverter circuit at a frequency determined by that of the oscillator 18. Thus, when the switching circuit 27 is closed, the first phase winding of the induction motor receives the pulses shown by the cross-hatched waveform 34a in FIG. 2.

The switching mechanism 27 comprises a series of four diodes 84, 85, 86 and 87, connected in a bridge circuit, and having a silicon rectifier 88 interconnecting the opposite terminals of the bridge circuit. Tracing through this circuit, it will be noted that when the silicon controlled rectifier 88 is conducting, current flows in one direction through the diode 84, the silicon controlled rectifier 88 and the diode 86 to the motor winding 13a, and during the next half cycle the current flows in the opposite direction through the diode 87, the silicon rectifier 88, and the remaining diode 85. Consequently, during both pulse half cycles from the inverter circuit, current flows through the silicon controlled rectifier 88, whereby the silicon controlled rectifier 88 regulates the current flow during both half cycles from the inverter to the motor winding 13a.

The silicon controlled rectifier 88 is triggered into operation during each half cycle of the inverter by means of a variable time delay circuit 41, such that it is rendered conducting for only a portion of each half cycle to permit current flow to the motor winding 13a. In this manner, by the time controlled operation of the silicon controlled rectifier 88, a variable amount of the power from the inverter circuit 24 can be regulated to flow to the motor winding 13a, as is desired.

Referring to the time delay circuit 41 for controlling the rectifier 88, it is noted that this circuit is substantially identical to the synchronizing delay circuit 22, and comprises a pair of transistors 89 and 90 interconnected in a time delayed arrangement by means of capacitor 91, resistor 92, and a regulating transistor 93. In the same manner as previously described, the transistor 93 functions as a controllable impedance in response to an adjustable voltage on line 59 to vary the time delay between pulses being applied to the circuit over line 95, and impulses being taken from this circuit over line 96 to trigger the silicon controlled rectifier 88 into operation.

For providing regulation during both half cycles of the inverter, the input line 95 of this time delay circuit receives energization from both output lines 62 and 63 of the oscillator circuit 18 through a pair of negatively poled diodes 97 and 98 that permit the passage of only negative impulses during each half cycle of the oscillator 18. During the first half cycle, when the output line 62 is rendered more negative, the negative impulse passes through the diode 97 to the input line 95 of this delay circuit thereby triggering the transistor 89 into operation and initiating the time delay as previously described. After a time delay proportional to the variable impedance provided by the transistor 93, the triggering impulse appears over outpuut line 96 to trigger the silicon controlled rectifier 88 into operation and thereby permit the remaining portion of the half cycle from the inverter circuit to energize the motor winding 13a. With this arrangement, it is noted that by varying the potential over line 59 and thereby controlling the conductivity of transistor 93, the silicon controlled rectifier 88 may be triggered into operation at any desired portion of each half cycle of the oscillator thereby to regulate the amount of current flow through the motor winding 13a in proportion to the potential on line 59.

During the second half cycle of the oscillator, the operation is substantially the same and line 63 receives a negative pulse from the oscillator 18 which passes through the reversely poled diode 98 to again trigger the time delay circuit into operation. After a time interval proportional to the delay imposed by the circuit, a triggering impulse again appears at the output line 96 to operate the rectifier 88 and permit the same variable portion of that next half cycle of the inverter to energize the motor winding 13a. By this arrangement, the time delay circuit 41 and the switch 27 regulate the amount of power being applied to the motor winding 13a by the inverter during both half cycles of the inverter thereby to provide full wave regulation of the energization of the motor winding.

As noted above, the control potential on line 59 also controls the frequency of the oscillator 18 and the time delay imposed by the synchronizing delay circuit 22, as well as that imposed by the energy delay circuit 41, which controls the power applied to the motor. Thus wherever the frequency of the oscillator 19 is changed, the synchronizing time delay between the three oscillators of the system is also changed to maintain each oscillator time displaced by 120 degrees from the next. Additionally at each different frequency the delay circuit 41 also changes to automatically regulate the amount of power applied to the motor winding 13a in proportion to the frequency.

The circuitry for energizing the second and third phases, 13b and 13c, of the motor are identical to that described for energizing the first phase 13a, and the oscillators and time delay circuits in each of these phases are all similarly controlled by the potential on line 59. In this manner, only a single speed control potentiometer 61 is needed both to maintain synchronism in the energization of the three phases of the motor and to regulate the amount of energy applied to the motor in proportion to the motor speed.

To insure that the three oscillators are properly functioning in time delayed sequence as desired before the inverter circuits are placed in operation, there is provided an initial delay circuit for briefly delayng the interconnection of the oscillators with the inverter circuits. As will be recalled from FIG. 3 the oscillators are selectively interconnected with the inverter circuits by a series of pairs of switches 44, 45, and 46. All of these switches are adapted to be operated together by the relay 47 mentioned earlier, which is energized after a given time interval after the power switch is closed.

Returning to FIG. 3, for an understanding of this circuit, the speed control lever 16 when initially adjusted from its "off" position, closes switches (not shown) to apply power to the three oscillators 18, 19 and 20 and to the synchronizing delay circuits 21 and 22. This lever 16 also closes a switch 100, FIG. 4, which applies the potential of the battery across a series connected capacitor 101 and resistor 102 connected in a timing circuit. After a short interval when capacitor 101 has received a predetermined charge, the voltage thereacross triggers a unijunction transistor 103 into operation, thereby passing current from the battery through series connected resistors 104 and 105, and through the unijunction transistor 103. The voltage drop across resistor 105 is applied to trigger a silicon controlled rectifier 106 into operation, thereby to apply energizing current to the starting relay 47 after a given time interval determined by the time constant of resistor 102 and capacitor 101. Energizing this relay 47, closes all of the switches 44, 45, and 46, FIG. 3, to interconnect the oscillators 18, 19, and 20, to their associated inverter circuits 24, 25 and 26 all as described above in connection with FIG. 3.

When using the form of circuit shown in FIG. 4, it is noted that the amplitude of the adjustable voltage on line 59 functions to simultaneously vary the frequency of the three oscillators 18, 19 and 20 and the phase delays produced by the synchronizing time delay circuits 21 and 22, all in such manner that the three oscillators are always maintained in synchronism at each different frequency and with each phase being delayed from the next by the required 120 degrees of proper three phase energization of the motor 13. Additionally, the energy control switches 27, 28 and 29 are also automatically regulated by the potential on line 59 to properly proportion the energy directed to the motor windings 13a, 13b, and 13c, for each different frequency to maintain optimum efficiency and performance. In each circuit, this control is obtained by the use of a transistor or transistors, such as transistors 55 and 58 in the oscillator circuits, which respond to the adjustable amplitude of voltage over line 59 to provide an adjustable impedance or current regulation in that circuit to bring about the change desired.

Figure 5:
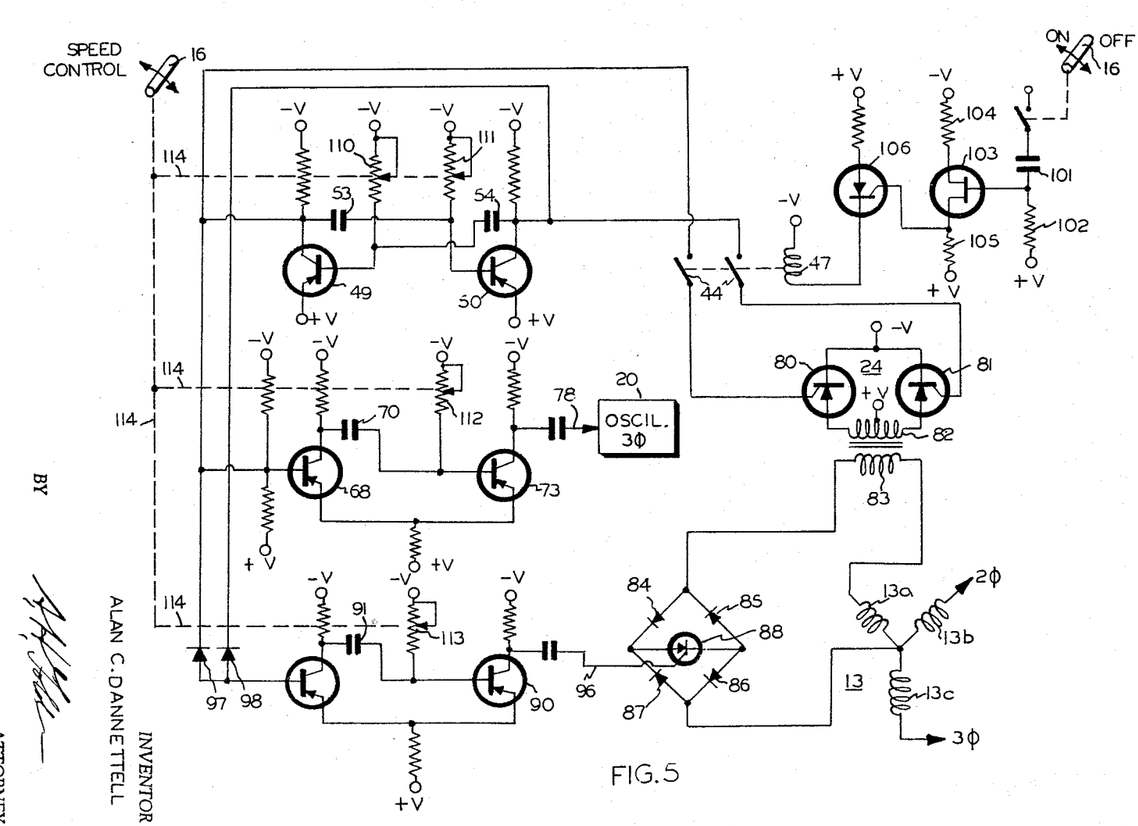
FIG. 5 is an electrical schematic diagram, similar to FIG. 4, and illustrating a modification of the circuitry of FIG. 4.

FIG. 5 illustrates an alternative manner of simultaneously adjusting these circuits in response to the positioning of the single speed control lever 16 to vary the frequency of the oscillators as well as to simultaneously regulate the energy directed to the motor windings at each different frequency for optimum performance. As shown, this is performed by providing in each of the circuits to be controlled a variable resistor or a pair of resistors, and providing means for mechanically interconnecting, or ganging, all of these resistors for simultaneous adjustment by the single speed control lever 16.

Referring to FIG. 5, the oscillator circuit, such as oscillator 18, in FIG. 3 is substantially the same as previously described in connections with FIG. 4, except for the substitution of adjustable resistor 110 for the transistor 55 of FIG. 4 and the substitution of adjustable resistor 111 for the transistor 58. Both of these resistors 110 and 111 are mechanically interconnected, as indicated by dotted line 114, to be varied together responsively to the positioning of the speed control lever 16. In operation, this oscillator functions in the same manner as previously described, in that variation of these resistances 110 and 111 changes the time constants of the charging circuits for the feedback timing capacitors 53 and 54 thereby to proportionally vary the frequency of the multivibrator circuit.

The time delay synchronising circuit, such as circuit 22 in FIG. 3, is similarly changed by substituting in FIG. 5, a variable resistor 112 in the capacitor charging circuit instead of the transistor 71 of FIG. 4. This resistor 112 is also mechanically interconnected, or ganged, for simultaneous adjustment along with resistors 110 and 111 of oscillator 18 by the single speed control lever 16, as indicated by the dotted line connection 114.

Similarly the time delay circuits, such as 41, FIG. 3, for controlling the energy control switches, such as switch 27, also employ an adjustable resistor 113 as shown in FIG. 5, instead of a transistor 93 as in FIG. 4, and interconnect this resistor for simultaneous adjustment by the single speed control lever 16, as shown.

In the embodiment of FIG. 5, there is provided four adjustable resistors for each phase, or a total of twelve adjustable resistors for all three phases, with all such resistors being mechanically interconnected, or ganged for simultaneous adjustment by the single speed control lever 16.

Although but preferred embodiments of the invention have been illustrated and described, it is believed evident to those skilled in the art that many changes may be made without departing from the spirit and scope of the invention. For example, although in the preferred embodiments of the invention as described, three automatically synchronized oscillators are employed for the three phases of the motor, it is contemplated that a single master oscillator may be employed together with appropriate phase shifters as phase delay circuits to provide the synchronized three phase signals desired. Accordingly, since this and other changes may be made, this invention is to be considered ars being limited only by the following claims appended hereto.

What is claimed is:

1. In a battery driven industrial truck,
   a multiple phase alternating current induction motor,
   a plurality of power inverter circuits energizable by the battery for producing alternating current impulses at the constant amplitude of the battery, to energize each phase of the motor,
   frequency adjustable oscillator means producing a series of phase displaced signals, one of each phase of the motor, and controlling the power inverter circuits to produce the alternating impulses at the frequency of the oscialtor means,
   a plurality of adjustable power regulator circuits, with one for each phase of the motor, for regulating the duration of the constant amplitude alternating current impulses from the inverter circuits energizing each phase of the motor,
   and a single manual control for enabling simultaneous and continuous adjustment of the oscillator means to change frequency, and simultaneous and continuous adjustment of the plurality of power regulator means to vary the power applied to the motor at each frequency.

2. In a battery driven industrial truck having a multiple phase induction driven motor,
   a plurality of inverter circuits, one for energizing each of the motor phases with constant amplitude pulses from the battery,
   an adjustable frequency timing control means for synchronizing each of the inverter circuits to produce alternating impulses at the same frequency as the timing control means and in predetermined time displaced phase relationship to drive the motor,
   a regulating circuit for each phase of the motor for regulating the duration of the pulses from the inverter circuit energizing that phase in proportion to the frequency, and direction control means for selectively controlling the time control means to vary the phase relationship of the inverter circuits and to reverse the direction of rotation of the motor.

3. In the industrial truck of claim 2, said regulating circuit comprising a time controllable rectifier interconnecting the inverter for each phase with the motor winding for that phase, and triggering means responsive to said adjustable frequency timing control for triggering said rectifier into operation at a different time instant during alternating cycles of said inverter in proportion to the frequency of the timing control means.

4. In a battery powered industrial truck having a multiple phase induction motor drive,
a plurality of multivibrators, one for each phase,
a plurality of synchronizing time delay circuits interconnecting the multivibrators for operation at the same frequency and in predetermined multiple time phase displacement.
a plurality of power inverter circuits energized by the battery and controlled by the oscillators for energizing the different phases of the motor at the oscillator frequency,
a plurality of power regulators for regulating the power produced by each inverter and directed to energize the different phases of the motor,
and a single speed control for simultaneously adjusting the frequency of the oscillators, the time delay circuits, and the power regulators, thereby to maintain the same frequency and phase synchronism between the oscillators at all different frequencies and to regulate the power applied to the motor in proportion to the frequency.

5. In a battery powered industrial truck having a multiple phase alternating current induction motor,
a plurality of power inverters, one for each phase of the motor,
a plurality of square wave oscillators for controlling the frequency of each inverter,
a plurality of power regulators, one for each inverter, for regulating the power from the inverter being applied to energize the motor.
time delay circuits interconnecting the oscillators to synchronize the oscilators at the same frequency and in a fixed multiple phase relation,
additional time delay circuits energized by said oscillators and controlling the power regulators,
and a single adjustable speed control for varying the frequency of the oscillators and conjunctively varying the time delay circuits to maintain the oscillators in the same synchronized phase displaced arrangement at all different frequencies,
said speed control also varying the additional time delay circuits to regulate the amount of power delivered to the motor by said regulator circuits in proportion to the speed of the motor.

6. In a battery powered industrial truck having a multiple phase induction motor drive,
means producing a plurality of phase displaced alternating current impulse signals for the multiple phases of the motor,
continuously adjustable means for varying the frequency of said signals in unison and maintaining the same electrical phasing between the signals at each different frequency,
said alternating current signal producing means including a plurality of oscillators and a plurality of time delay circuits being one less in number than the number of oscillators,
said time delay circuits each interconnecting a different pair of said oscillators to synchronize the frequency and phase displacement therebetween,
said continuously adjustable means simultaneously changing the time delay provided by said time delay circuits at each different frequency thereby to maintain the electrical phasing of said oscillators constant at all frequencies, and direction control means for selectively varying the phase relationship of said plurality of oscillators to reverse the direction of rotation of the motor.

7. In a battery powered industrial truck driven by an alternating current motor,
an adjustable frequency oscillator circuit,
a power inverter circuit controlled by the oscillator,
a power regulator interconnecting the inverter and the motor,
said power regulator including a solid state controlled rectifier,
a time delay circuit energized by said oscillator and connected to trigger said controlled rectifier into operation during each cycle of the alternator,
and a speed control coupled to said oscillator to enable continuous variation of the frequency for changing the speed of the motor and being coupled to said time delay circuit to conjunctively vary the time delay for each different frequency thereby to adjustably regulate the power to the motor at each different speed.

8. In the industrial truck of claim 7, said motor being a multiple phase induction motor having said inverter circuit, power regulator, and time delay circuit for each phase, and said speed control being coupled to all of said time delay circuits for simultaneously regulating the frequency and power to all phases of the motor.

9. In the device of claim 8,
a plurality of said oscillators with one for each phase of the motor,
synchronizing time delay means for interconnecting all but one different pair of the oscillators,
and said speed control being coupled to all of said synchronizing time delay means for conjunctively varying the time delay of each proportional to the frequency of the oscillators thereby to maintain the fixed electrical phasing of the oscillators constant at all frequencies.

10. In a battery driven industrial truck, a multiple phase alternating current induction motor, a plurality of power inverter circuits energizable by the battery for producing alternating current impulses, to energize each phase of the motor, frequency adjustable oscillator means producing a series of phase displaced signals, one for each phase of the motor, and controlling the power inverter circuits to produce the alternating impulses at the frequency of the oscillator means, a plurality of adjustable power regulator circuits, with one for each phase of the motor, for regulating the power from the inverter circuits energizing each phase of the motor, and a single manual control for enabling simultaneous and continuous adjustment of the oscillator means to change frequency, and simultaneous and continuous adjustment of the plurality of power regulator means to vary the power applied to the motor at each frequency, and direction control means associated with the oscillator means for selectively reversing the phase relationship of the phase displaced signals to reverse the direction of rotation of the motor.

11. In a battery driven industrial truck, a multiple phase alternating current induction motor, a plurality of power inverter circuits energizable by the battery for producing alternating current impulses, to energize each phase of the motor, frequency adjustable oscillator means producing a series of phase displaced signals, one for each phase of the motor, and controlling the power inverter circuits to produce the alternating impulses at the frequency of the oscillator means, a plurality of adjustable power regulator circuits, with one for each phase of the motor, for regulating the power from the inverter circuits energizing each phase of the motor, and a single manual control for enabling simultaneous and continuous adjustment of the oscillator means to change frequency, and simultaneous and continuous adjustment of the plurality of power regulator means to vary the power applied to the motor at each frequency, and a time delay means interconnecting the oscillator means with the power inverter means and disabling the operation of the plurality of inverters until the series of signals from the oscillator means have reached the desired multiphase synchronized time relationship.

12. In an industrial truck having a multiple phase alternating current induction drive motor, an inverter circuit for energizing each phase of the motor, an adjustable frequency timer means for synchronizing the inverters in frequency corresponding to the timer frequency and synchronizing the inverters in the multiple phase relationship required by the multiple phase motor, a power regulator interconnecting each inverter with its associated phase of the motor, a time delay circuit for each power regulator and being energized by said adjustable frequency timer to control the power passed by said regulator, and a manually operable speed control for simultaneously adjusting said frequency timer and said time delay circuits to change the speed of the motor and conjunctively regulate the power applied to the motor in proportion to the motor speed, said frequency timer including a plurality of adjustable frequency oscillators with one for each of the inverters, synchronizing means for synchronizing the frequencies of the oscillators and phasing the oscillators in the multiple phase relationship required by the motor.

13. An industrial truck energized by an electric battery comprising: a truck frame equipped with a series of ground engaging wheels including a traction wheel, a multiple phase induction motor forming a traction motor coupled to reversibly drive said traction wheel, an electronic motor control system energized by said electric battery and providing multiple phase alternating current pulses to energize the multiple phases of said traction motor, a speed control member coupled to said motor control system for varying the frequency of the alternating current pulses to the motor to change its speed and conjunctively regulating the energy of the pulses at each different frequency to vary the power at each frequency, and means operable for selectively changing the phase of the alternating current pulses to reverse the direction in which the traction motor will drive the traction wheel.

14. In the industrial truck of claim 13, said motor control system comprising for each phase of the traction motor an inverter for converting the potential of the battery to constant amplitude alternating current impulses and a power regulator for varying the duration of the impulses to vary the power applied to the traction motor at different frequencies.

References Cited by the Examiner
UNITED STATES PATENTS 2,784,365 3/1957 Fenemore et al. ___ 318—231 X
3,105,180 9/1963 Burnett ___________ 318—231 X ORIS L. RADER, *Primary Examiner.*

G. Z. RUBINSON, *Assistant Examiner.*

UNITED STATES PATENT OFFICE
CERTIFICATE OF CORRECTION

Patent No. 3,289,062                                          November 29, 1966

Alan C. Dannettell

It is hereby certified that error appears in the above numbered patent requiring correction and that the said Letters Patent should read as corrected below.

Column 5, line 35, after "240°" insert -- behind oscillator 20, or in other words, by 120° --; column 9, line 36, for "of" read -- for --; column 10, line 32, for "ars" read -- as --; line 42, for "of", second occurrence, read -- for --.

Signed and sealed this 7th day of November 1967.

(SEAL)
Attest:

Edward M. Fletcher, Jr.
Attesting Officer

EDWARD J. BRENNER
Commissioner of Patents